(12) United States Patent
Kang et al.

(10) Patent No.: US 12,339,757 B2
(45) Date of Patent: Jun. 24, 2025

(54) METHOD FOR ERROR INJECTION, ELECTRONIC DEVICE, AND COMPUTER PROGRAM PRODUCT

(71) Applicant: Dell Products L.P., Round Rock, TX (US)

(72) Inventors: Jianbin Kang, Beijing (CN); Sihang Xia, Beijing (CN); Dan Xiao, Chongqing (CN)

(73) Assignee: Dell Products L.P., Round Rock, TX (US)

( * ) Notice: Subject to any disclaimer, the term of this patent is extended or adjusted under 35 U.S.C. 154(b) by 13 days.

(21) Appl. No.: 18/221,562

(22) Filed: Jul. 13, 2023

(65) Prior Publication Data

US 2024/0232031 A1    Jul. 11, 2024

(30) Foreign Application Priority Data

Jan. 6, 2023    (CN) .......................... 202310021232.4

(51) Int. Cl.
*G06F 11/263*    (2006.01)
(52) U.S. Cl.
CPC .................. *G06F 11/263* (2013.01)
(58) Field of Classification Search
CPC ..................................... G06F 11/263
USPC .......................................... 714/32
See application file for complete search history.

(56) References Cited

U.S. PATENT DOCUMENTS

| | | | |
|---|---|---|---|
| 7,234,081 B2 | 6/2007 | Nguyen et al. | |
| 7,406,628 B2 | 7/2008 | Edgar et al. | |
| 8,392,766 B2 | 3/2013 | Chyan | |
| 8,949,798 B2 | 2/2015 | Albot et al. | |
| 9,405,646 B2 | 8/2016 | Yigzaw et al. | |
| 2011/0179311 A1* | 7/2011 | Nachimuthu | G06F 11/3676 714/E11.144 |
| 2019/0188064 A1* | 6/2019 | Ciraula | G11C 29/4401 |

* cited by examiner

*Primary Examiner* — Yair Leibovich
(74) *Attorney, Agent, or Firm* — BainwoodHuang

(57) ABSTRACT

An error injection technique involves: receiving a logic error including an injection address parameter and an injection error parameter, and matching the injection address parameter in the logic error with a request address parameter in a response to a data request in at least one workflow. The technique further involves: in a case that the injection address parameter is matched with the request address parameter, injecting the injection error parameter into the response to the data request. Such a technique provides a flexible error injection mode, which may fully test the reliability and availability of storage devices, thereby providing high-quality storage services for users.

20 Claims, 7 Drawing Sheets

METHOD FOR ERROR INJECTION, ELECTRONIC DEVICE, AND COMPUTER PROGRAM PRODUCT

CROSS-REFERENCE TO RELATED APPLICATION

This application claims priority to Chinese Patent Application No. CN202310021232.4, on file at the China National Intellectual Property Administration (CNIPA), having a filing date of Jan. 6, 2023, and having "METHOD, ELECTRONIC DEVICE, AND COMPUTER PROGRAM PRODUCT FOR ERROR INJECTION" as a title, the contents and teachings of which are herein incorporated by reference in their entirety.

TECHNICAL FIELD

Embodiments of the present disclosure relate to the field of computer processing, and more particularly to a method for error injection, an electronic device, and a computer program product.

BACKGROUND

With the development of data storage technologies, various data storage devices can already provide users with higher and higher data storage capacities. While improving the data storage capacities, users also put forward higher and higher demands for the reliability and availability of data storage devices. At present, a widely used evaluation scheme for the reliability and availability of storage devices is error injection. The error injection refers to the injection of some specific errors into a target storage device, resulting in expected faults of the target storage device. The reliability and availability of the target storage device may be evaluated by observing the behavior of the target storage device in the case of a fault.

SUMMARY OF THE INVENTION

Embodiments of the present disclosure provide a method for error injection, an electronic device, and a computer program product.

According to a first aspect of the present disclosure, a method for error injection is provided. The method includes: receiving a logic error including an injection address parameter and an injection error parameter, and matching the injection address parameter in the logic error with a request address parameter in a response to a data request in at least one workflow. The method further includes: in response to that the injection address parameter is matched with the request address parameter, injecting the injection error parameter into the response to the data request.

According to a second aspect of the present disclosure, an electronic device is provided. The electronic device includes at least one processor; and a memory coupled to the at least one processor and having instructions stored thereon, wherein the instructions, when executed by the at least one processor, cause the electronic device to perform actions including: receiving a logic error including an injection address parameter and an injection error parameter; matching the injection address parameter in the logic error with a request address parameter in a response to a data request in at least one workflow; and in response to that the injection address parameter is matched with the request address parameter, injecting the injection error parameter into the response to the data request.

According to a third aspect of the present disclosure, a computer program product is provided. The computer program product is tangibly stored on a non-volatile computer-readable medium and includes machine-executable instructions, wherein the machine-executable instructions, when executed, cause a machine to perform steps of the method in the first aspect of the present disclosure.

BRIEF DESCRIPTION OF THE DRAWINGS

By more detailed description of example embodiments of the present disclosure with reference to the accompanying drawings, the above and other objectives, features, and advantages of the present disclosure will become more apparent, wherein identical reference numerals generally represent identical components in the example embodiments of the present disclosure.

In the accompanying drawings, identical or corresponding numerals represent identical or corresponding parts.

DETAILED DESCRIPTION

Figure 1:
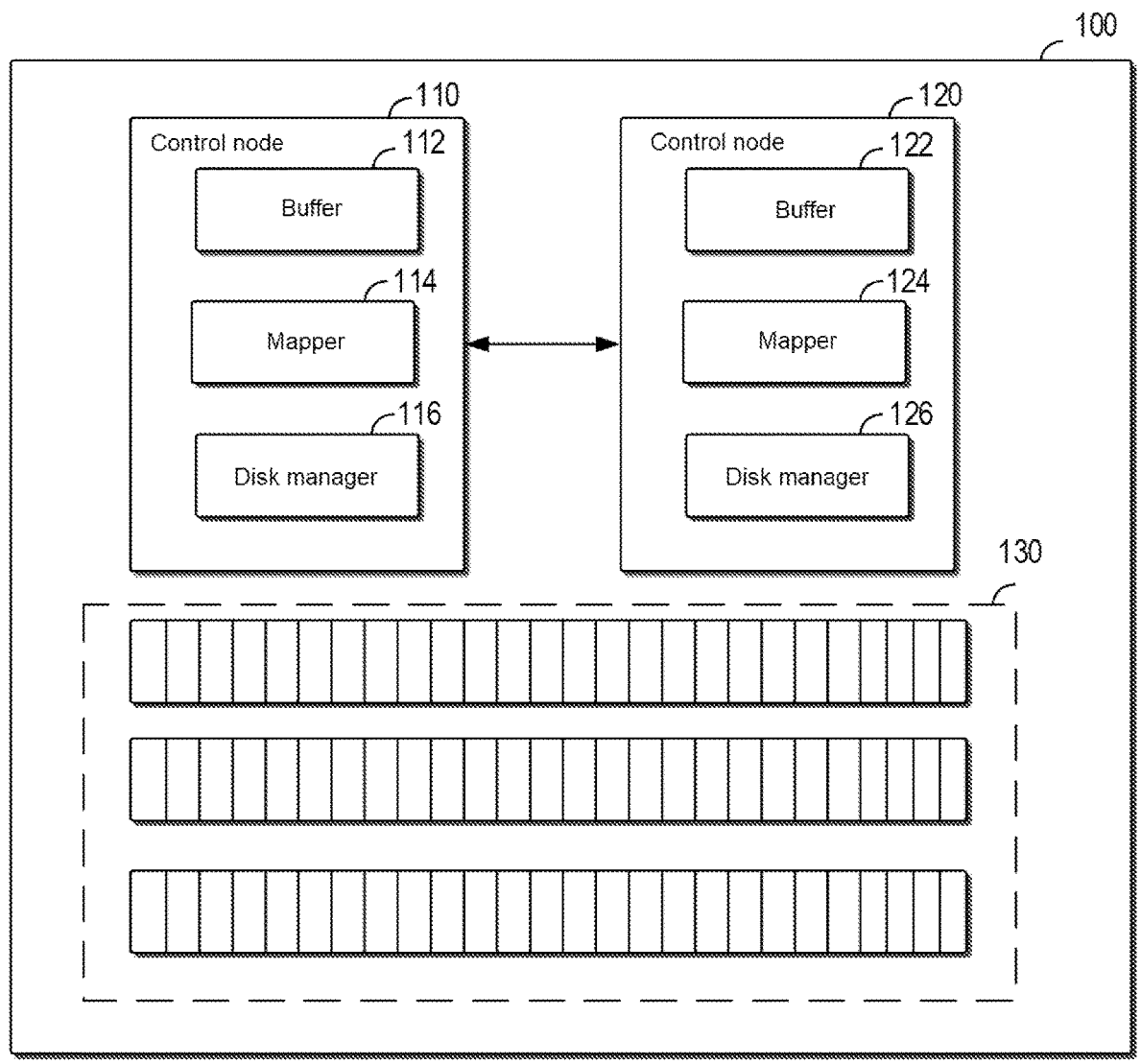
FIG. 1 shows a schematic diagram of an example device in which the embodiments of the present disclosure may be implemented.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

The embodiments of the present disclosure will be described in more detail below with reference to the accompanying drawings. Although the accompanying drawings show some embodiments of the present disclosure, it should be understood that the present disclosure may be implemented in various forms, and should not be explained as being limited to the embodiments stated herein. Rather, these embodiments are provided for understanding the present disclosure more thoroughly and completely. It should be understood that the accompanying drawings and embodiments of the present disclosure are for example purposes only, and are not intended to limit the protection scope of the present disclosure.

In the description of the embodiments of the present disclosure, the term "include" and similar terms thereof should be understood as open-ended inclusion, that is, "including but not limited to." The term "based on" should be understood as "at least partially based on." The term "an embodiment" or "the embodiment" should be understood as "at least one embodiment." The terms "first," "second," and the like may refer to different or identical objects. Other explicit and implicit definitions may also be included below.

In a storage device, the reliability and availability of the storage device are usually evaluated by error injection. Some specific errors may be injected into a target storage device to observe expected faults of the target storage device. The reliability and availability of the target storage device may be evaluated by observing the behavior of the target storage device in the case of a fault.

In order to test the processing of faults or errors by a storage device, a user needs to generate various errors to trigger a corresponding error processing procedure. The current method is usually to simulate the status in a tested workflow. For example, error injection is implemented by modifying a "normal" or "good" status into a "bad" status, thereby triggering an error processing procedure in the workflow.

Because the current error injection simulates the status in the tested workflow, the current error injection may not simulate errors in a buffer or a disk manager in a storage device. Accordingly, the simulated errors may only be sensed by the tested workflow, but may not be sensed by other workflows. However, during an actual operation of the storage device, this is impossible. This is because during the actual operation of the storage device, an error exists in the buffer or the disk manager of the device, and all workflows may sense the error. In addition, the current error injection mode does not simulate how other workflows respond to the error when the error occurs.

In addition, simulation of the status requires injection of specific codes into the workflow. Due to a large number of workflows, the simulation process is difficult to cover all code paths. In addition, if any workflow changes, the corresponding simulated status code also needs to be changed, which will increase the workload of code maintenance. Moreover, only the error injection in a simulated status may not verify whether the storage device will correctly respond and perform an appropriate error processing procedure when data is damaged.

Therefore, at least in order to solve the above problems and other potential problems, the embodiments of the present disclosure provide a method for error injection. The method includes: a logic error including an injection address parameter and an injection error parameter is received, and the injection address parameter in the logic error is matched with a request address parameter in a response to a data request in at least one workflow. The method further includes: in a case that the injection address parameter is matched with the request address parameter, the injection error parameter is injected into the response to the data request. The method for error injection according to the embodiments of the present disclosure provides a flexible error injection mode, which may fully test the reliability and availability of storage devices, thereby providing high-quality storage services for users.

The embodiments of the present disclosure will be further described in detail below with reference to the accompanying drawings, wherein FIG. 1 shows a schematic diagram of an example storage device 100 in which the embodiments of the present disclosure may be implemented.

Example storage device 100 may include control node 110, control node 120, and disk array 130, wherein control node 120 may be used as a backup node of control node 110 to perform a backup operation when control node 110 has a fault. Control node 110 may communicate with control node 120 via physical connection. Disk array 130 may include a redundant array of independent disks (RAID), as shown in FIG. 1. Control node 110 and control node 120 are configured to perform management, accessing, and other operations on a plurality of storage disks in the storage device. The "disk" described here may refer to any non-volatile storage medium currently known or to be developed in the future, and includes, but is not limited to, a magnetic disk, an optical disk, a solid status disk (SSD), or the like. In the description herein, it will be collectively referred to as "disk" for description. However, it should be understood that this is for convenience of description only and does not imply any limitation on the scope of the present disclosure. Those skilled in the art may select a suitable non-volatile storage medium according to application requirements. In addition, disk array 130 shown in FIG. 1 is only illustrative. Those skilled in the art may set disk array 130 including various numbers of storage disks according to actual needs, which is not limited in the present disclosure.

As shown in FIG. 1, control node 110 may include buffer 112 (such as a cache), mapper 114, and disk manager 116. In some embodiments, the mapper is configured to establish a storage mapping mechanism from a logical storage space to a physical storage space at a small granularity (for example, 4 KB). Buffer 112 may interact with mapper 114 and provide a transaction memory interface. Disk manager 116 may be configured to manage disks in disk array 130. For example, disk manager 116 may consume all available drives in storage device 100, bind each type of these drives to an RAID group, and import physical storage as different tiers of a storage space into mapper 114. As a backup node of control node 110, the functions of buffer 122, mapper 124, and disk manager 126 in control node 120 are respectively similar to those of buffer 112, mapper 114, and disk manager 116 in control node 110, which will not be repeated here for the sake of brevity.

According to the method for error injection in the embodiments of the present disclosure, the error data or error type (indicating the error status in the workflow) or both of the error data and the error type can be injected into a response to the data request accessing the data request in buffer 112 or disk manager 116, so as to observe expected faults in storage device 100. As a result, the reliability and availability of the storage device may be evaluated by observing the responding behavior of storage device 100 in the case of a fault. In some embodiments, storage device 100 may receive a logic error including an injection address parameter and an injection error parameter, match the injection address parameter in the logic error with a request address parameter in the response to a data request in at least one workflow, and inject the injection error parameter into the response to the data request in response to that the injection address parameter is matched with the request address parameter. In some embodiments, the data request may be a request for buffer 112 (such as a page request), or a request for disk manager 116. The data request (such as a page request) will be described in detail below in the case of buffer 112 and in the case of disk manager 116 with reference to the accompanying drawings.

In some embodiments, an injection error may trigger storage device 100 to perform an error processing procedure. For example, mapper 114 in control node 110 may perform a corresponding error processing procedure. In response to the error processing procedure performed by mapper 114, it is possible to determine whether storage device 100 may appropriately process the error, thereby verifying the reliability and availability of storage device 100. In addition, when the reliability of storage device 100 may not meet the requirements, corresponding measures may be taken for storage device 100, thereby improving the reliability and availability of the storage device so as to provide high-quality storage services for users.

According to the method for error injection in the embodiments of the present disclosure, by matching the injection address parameter in the logic error with the request address parameter in the response to the data request in the workflow, all workflows that access the request address matched with the injection address parameter may sense the error, so that the storage system may be tested fully and flexibly. In addition, by injecting the error data or the error data and the error type into the response to the data request, whether the storage device may correctly respond and perform an appropriate error processing procedure when the data is damaged may be verified, so that the accuracy and precision of reliability verification may be improved so as to further provide high-quality storage services for users.

Figure 2:
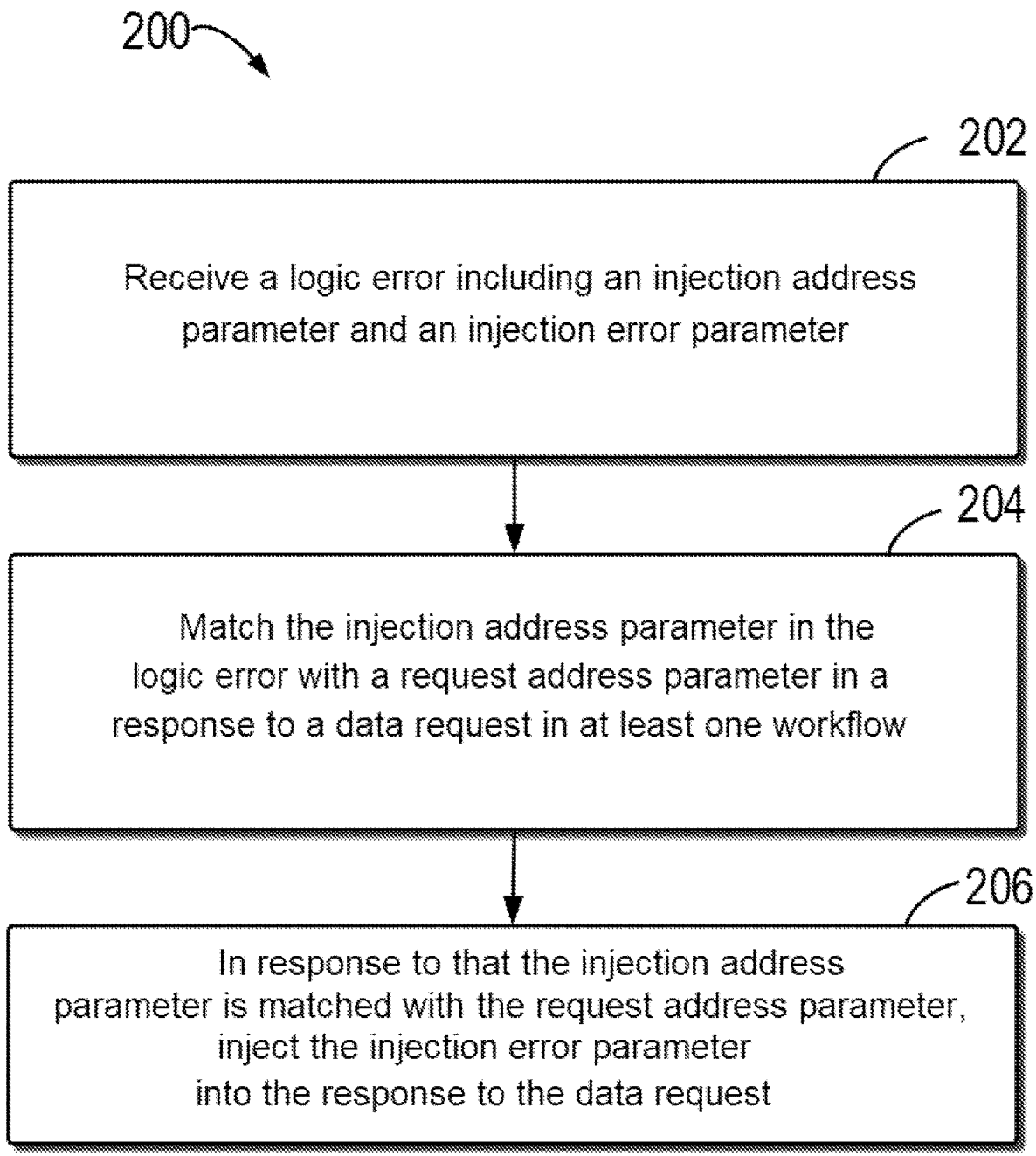
FIG. 2 describes a flow chart of a method for error injection according to an embodiment of the present disclosure.

The block diagram of example storage device 100 in which the embodiments of the present disclosure may be implemented is described above with reference to FIG. 1. A flow chart of method 200 for error injection according to an embodiment of the present disclosure will be described below with reference to FIG. 2. Actions involved in method 200 are described below with reference to storage device 100 as shown in FIG. 1. For example, in some embodiments, method 200 may be performed by storage device 100. It should be understood that method 200 may further include additional actions not shown and/or may omit actions shown, and the scope of the present disclosure is not limited in this aspect.

In block 202, storage device 100 receives a logic error including an injection address parameter and an injection error parameter. In some embodiments, the logic error represents a corresponding error defined for the storage device, and the logic error may include a plurality of parameters for error injection. The logic error according to the embodiments of the present disclosure may include an injection address parameter and an injection error parameter. The injection address parameter represents the address corresponding to the injection error parameter. That is, the storage device may inject the injection error parameter into a response to the data request matched with the injection address parameter (described in detail below). The injection error parameter represents the content of an injected error and may include at least one of an error type and error data, wherein the error type indicates an error status in at least one workflow, such as a "bad" status; and the error data includes data of the error that may be injected, for example, the injected error data may be obtained by modifying correct data.

In some embodiments, the logic error may further include an injection component parameter for indicating whether the injection address parameter corresponds to the buffer or the disk manager. The injection component parameter is associated with the injection address parameter. Specifically, when the injection component parameter indicates the buffer, the injection address parameter includes a page address in the buffer. When the injection component parameter indicates the disk manager, the injection address parameter includes a logic address in the disk manager. In addition, the logic error may further include an identifier (ID) for identifying the logic error. Users may query and verify the logic error according to the ID of the logic error.

In block 204, storage device 100 matches the injection address parameter in the logic error with the request address parameter in the response to the data request in at least one workflow. In some embodiments, control node 110 of storage device 100 may send a data request for buffer 112 so as to access buffer 112. Since the data is stored in a page in buffer 112, the data request for buffer 112 may accordingly include a page request. Control node 110 of storage device 100 may also send a data request for disk manager 116 so as to access disk manager 116. The data request may be used for requesting data between components, and accordingly, the components may respond to the received data request to generate a response to the data request so as to transfer the requested data.

Figure 3A:
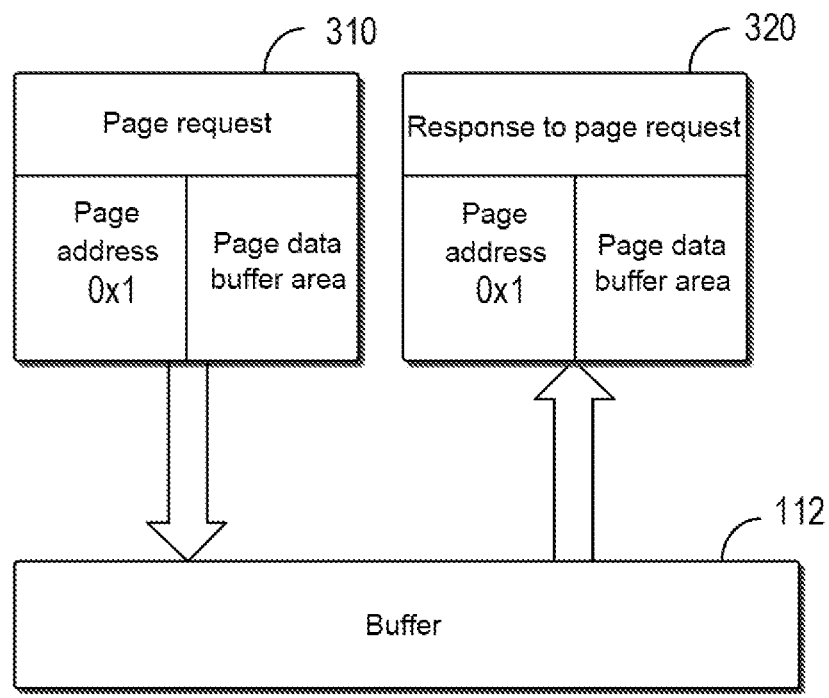
FIG. 3A shows a data request for a buffer and a corresponding response to the data request according to an embodiment of the present disclosure.
Figure 3B:
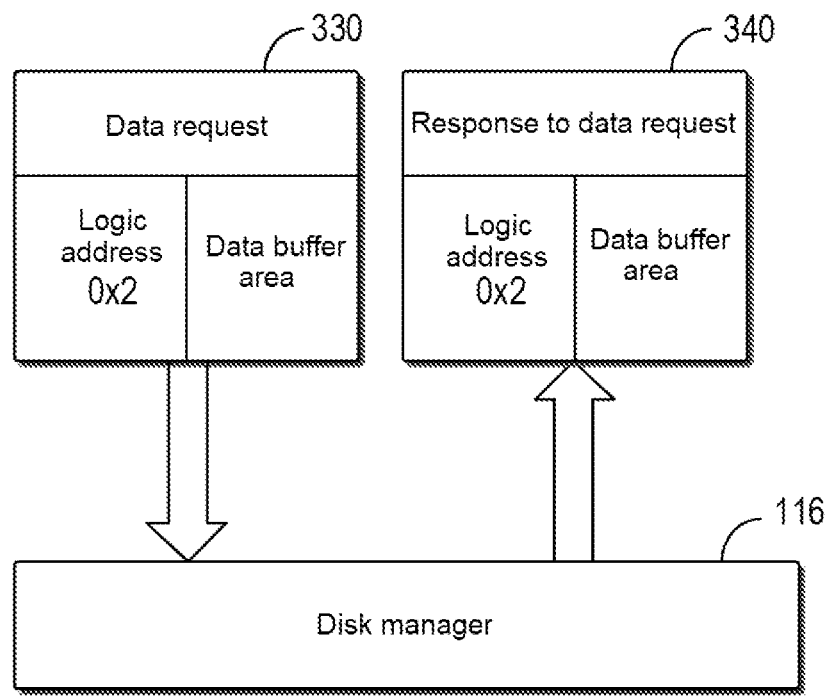
FIG. 3B shows a data request for a disk manager and a corresponding response to the data request according to an embodiment of the present disclosure.

FIG. 3A and FIG. 3B respectively show data requests for a buffer and a disk manager and a corresponding responses to the data requests according to the embodiments of the present disclosure. FIG. 3A shows a data request (such as a page request) for a buffer and a corresponding response to the data request (such as the response to the page request) according to an embodiment of the present disclosure. As shown in FIG. 3A, storage device 100 may send page request 310 for buffer 112 in a workflow to access buffer 112 and obtain data from buffer 112. As it is a page request for buffer 112, page request 310 may include a request address accordingly. The request address may be a page address (such as 0x1) of buffer 112. In addition, page request 310 may further include a data buffer area (such as a page data buffer area) for transferring data between components. Buffer 112 may generate response 320 to the page request in response to received page request 310. Moreover, as shown in FIG. 3A, response 320 to the page request includes a page address (such as 0x1) of buffer 112 accessed by the workflow and a data buffer area (such as a page data buffer area) containing data from the page address (such as 0x1) of buffer 112.

It can be understood that for the convenience of explanation and description, page request 310 and response 320 to the page request are shown as two separate data packets in FIG. 3A. However, it can be understood that page request 310 and response 320 to the page request may share the same data packet. For example, after page request 310 is received, buffer 112 may generate response 320 to the page request by loading the data in the page address in page request 310 into the data buffer area in page request 310 (for example, replacing the previous data in the page data buffer area), and transfer response 320 in the workflow.

Similarly, FIG. 3B shows a data request for a disk manager and a corresponding response to the data request according to an embodiment of the present disclosure. As shown in FIG. 3B, storage device 100 may send data request 330 for disk manager 116 in a workflow to access disk manager 116 and obtain data from disk manager 116. As it is a data request for disk manager 116, data request 330 may include a request address accordingly. The request address may be a logic address (such as 0x2) of disk manager 116. In addition, data request 330 may further include a data buffer area for transferring data between components. Disk manager 116 may generate response 340 to the data request in response to received data request 330. Moreover, as shown in FIG. 3B, response 340 to the data request includes a logic address (such as 0x2) of disk manager 116 accessed by the workflow and a data buffer area containing data from the logic address (such as 0x2) of disk manager 116.

It can be understood that for the convenience of explanation and description, data request 330 and response 340 to the data request are shown as two separate data packets in FIG. 3B. However, it can be understood that data request 330 and response 340 to the data request may share the same data packet. For example, after data request 330 is received, disk manager 116 may generate response 340 to the data request by loading the data in the logic address in data request 330 into the data buffer area in data request 330 (for example, replacing the previous data in the data buffer area), and transfer response 340 in the workflow.

Returning to FIG. 2, storage device 200 may match the injection address parameter in the logic error with the request address parameter in the response to the data request in at least one workflow. As mentioned above, the response to the data request may come from a corresponding component according to the data request of the workflow for different components. For example, the response to the data request may include response 320 to the data request returned from buffer 112 (such as the response to a page request), or response 340 to the data request returned from disk manager 116. Accordingly, the response to the page request returned from buffer 112 includes a page address of buffer 112, and the response to the data request returned from disk manager 116 includes a logic address of disk manager 116.

As mentioned above, the injection address parameter in the logic error includes a page address or a logic address, and the injection address parameter is associated with the injection component parameter in the logic error. When the injection component parameter indicates the buffer, the injection address parameter includes a page address in the buffer. When the injection component parameter indicates the disk manager, the injection address parameter includes a logic address in the disk manager. Storage device 200 may match the injection address parameter in the logic error with the request address parameter in the response to the data request in at least one workflow, so as to determine the response to the data request to be injected with an error.

For example, assuming that the injection component parameter included in the logic error indicates the buffer and the injection address parameter is page address 0x1, the injection error parameter includes error data: 00001111. Assuming that storage device 100 has 5 workflows: workflows 1-5, wherein workflows 1-3 are workflows for accessing buffer 112, and workflows 4 and 5 are workflows for accessing disk manager 116. A request address in a data request (such as a page request) and the response to the data request (such as the response to the page request) in workflow 1 is a page address, and the page address is 0x1. A request address in a data request (such as a page request) and the response to the data request (such as the response to the page request) in workflow 2 is a page address, and the page address is 0x3. A request address in a data request (such as a page request) and the response to the data request (such as the response to the page request) in workflow 3 is a page address, and the page address is 0x1. A request address in a data request and the response to the data request in workflow 4 is a logic address, and the logic address is 0x1. A request address in a data request and the response to the data request in workflow 5 is a logic address, and the logic address is 0x4.

During matching between address parameters, storage device 100 may compare the injection address parameter in the logic error with the request address parameter in the response to the data request in the workflow, so as to determine the response to the data request matched with the injection address parameter.

In block 206, storage device 100 injects the injection error parameter in the logic error into the corresponding response to the data request in response to that the injection address parameter is matched with the request address parameter. Still taking the above example as an example for illustration, by comparing the injection address parameter in the logic error (such as page address 0x1) with the request address parameter in the response to the data request in the workflow, storage device 100 determines that the request address parameters in the responses to the data requests in workflows 1 and 3 are matched with the injection address parameter in the logic error. As a result, storage device 100 may inject the error data 00001111 included in the injection error parameter in the logic error into the responses to the data requests in workflows 1 and 3. That is, storage device 100 injects the error data 00001111 into a data buffer area in the response to the data request (such as the response to the page request) in workflow 1, and injects the error data 00001111 into a data buffer area in the response to the data request in workflow 3, thereby implementing error injection.

In some embodiments, in response to that the data in the response to the data request is modified into error data, the storage device may further verify whether the status in the workflow in which the data is located is changed to a bad status. When it is determined that the corresponding status is changed to a bad status, it can be determined that storage device 100 may respond to the error data as expected. When it is determined that the corresponding status is not changed, it can be determined that the storage device may not respond to the error data as expected. Accordingly, measures may be taken to process the storage device, so that the storage device may correctly respond to the error data. Therefore, according to the method for error injection in the embodiments of the present disclosure, it is possible to verify whether the storage device may correctly respond and perform an appropriate error processing procedure when the data is damaged by modifying the data. As a result, the accuracy and precision of reliability verification may be improved so as to further provide high-quality storage services for users.

Although the above example is illustrated by taking the injection error parameter including error data as an example, it can be understood that the injection error parameter may further include an error status, and storage device 100 may perform a similar operation to inject the error state into the response to a target data request. This will not be repeated here for the sake of brevity. In addition, the injection error parameter may further include both of the error status and the error data, and storage device 100 may perform a similar operation to inject both of the error status and the error data into the response to the target data request. This will not be repeated here for the sake of brevity.

It can be seen from the above description that according to the method for error injection in the embodiments of the present disclosure, by matching the injection address parameter in the logic error with the request address parameter in the response to the data request in the workflow, all workflows that access the request address matched with the injection address parameter may sense the error, so that the storage device may be tested fully and flexibly so as to provide high-quality storage services for users.

Figure 4:
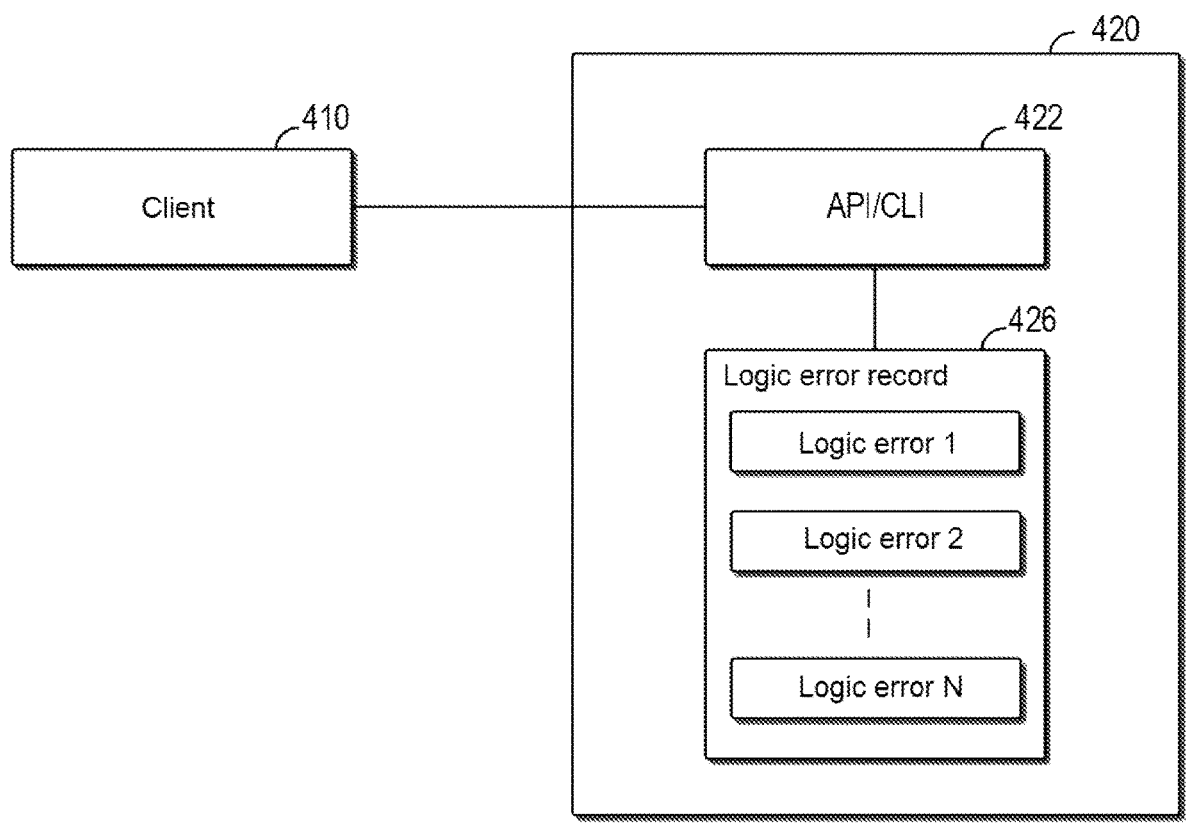
FIG. 4 shows a schematic block diagram for generating and storing logic errors according to an embodiment of the present disclosure.

In some embodiments, the logic error may be stored in a logic error record. For example, the logic error may include an identifier ID. Accordingly, the logic error may be stored in the logic error record according to the ID of the logic error. FIG. 4 shows schematic block diagram 400 for generating and storing logic errors according to an embodiment of the present disclosure.

FIG. 4 includes client 410 and architecture 420 for storing logic errors. Architecture 420 for storing logic errors includes interface 422 and logic error record 426. In some embodiments, interface 422 may include an application programming interface (API), interface 422 may also include a command line interface (CLI), and interface 422 may further include the API and the CLI. Client 410 may invoke an appropriate interface according to needs. In addition, other types of interfaces may also be set according to needs. The type and number of interfaces are not limited in the present disclosure.

Logic error record 426 may include a storage module for storing one or a plurality of logic errors. In some embodiments, client 410 may send a logic error storage request and invoke the API or CLI to store the logic error in logic error record 426. The logic error to be stored includes specific information of error injection, such as a specific injection address parameter, a specific injection error parameter, a specific injection component parameter, and a specific value of an ID. The logic error may be stored in logic error record 426 according to the ID, for example, in the form of a table. Accordingly, a plurality of logic errors, such as logic error 1 to logic error N, may be stored in logic error record 426, and each logic error includes specific injection parameters. For example, the ID of logic error 1 may be 1, the injection component parameter indicates the buffer, the injection address parameter includes page address 0x1 in the buffer, and the injection error parameter includes an error type: stale data and error data: 00110011. The ID of logic error 2 may be 2, the injection component parameter indicates the disk manager, the injection address parameter includes logic address 0x2 in the disk manager, and the injection error parameter includes an error type: media error, etc. Therefore, a plurality of logic errors may be stored in logic error record 426. When storage device 100 needs to perform error injection, for example, in response to an enabling request for error injection, storage device 100 may receive one or a plurality of logic error 1 to logic error N from logic error record 426, so that the error injection may be implemented conveniently.

In some embodiments, in response to that a logic error is injected into the response to the data request, storage device 100 may further update the number of times of injection corresponding to the logic error in logic error record 426. In addition, storage device 100 may further update the number of times of triggering an error processing operation corresponding to the logic error in logic error record 426. Therefore, by querying logic error record 426, users may obtain the number of times of injecting a target logic error into the storage device and the number of times of triggering the corresponding error processing operation, thereby verifying whether the target logic error is appropriately processed so as to provide a basis for reliability verification of the storage device.

Figure 5:
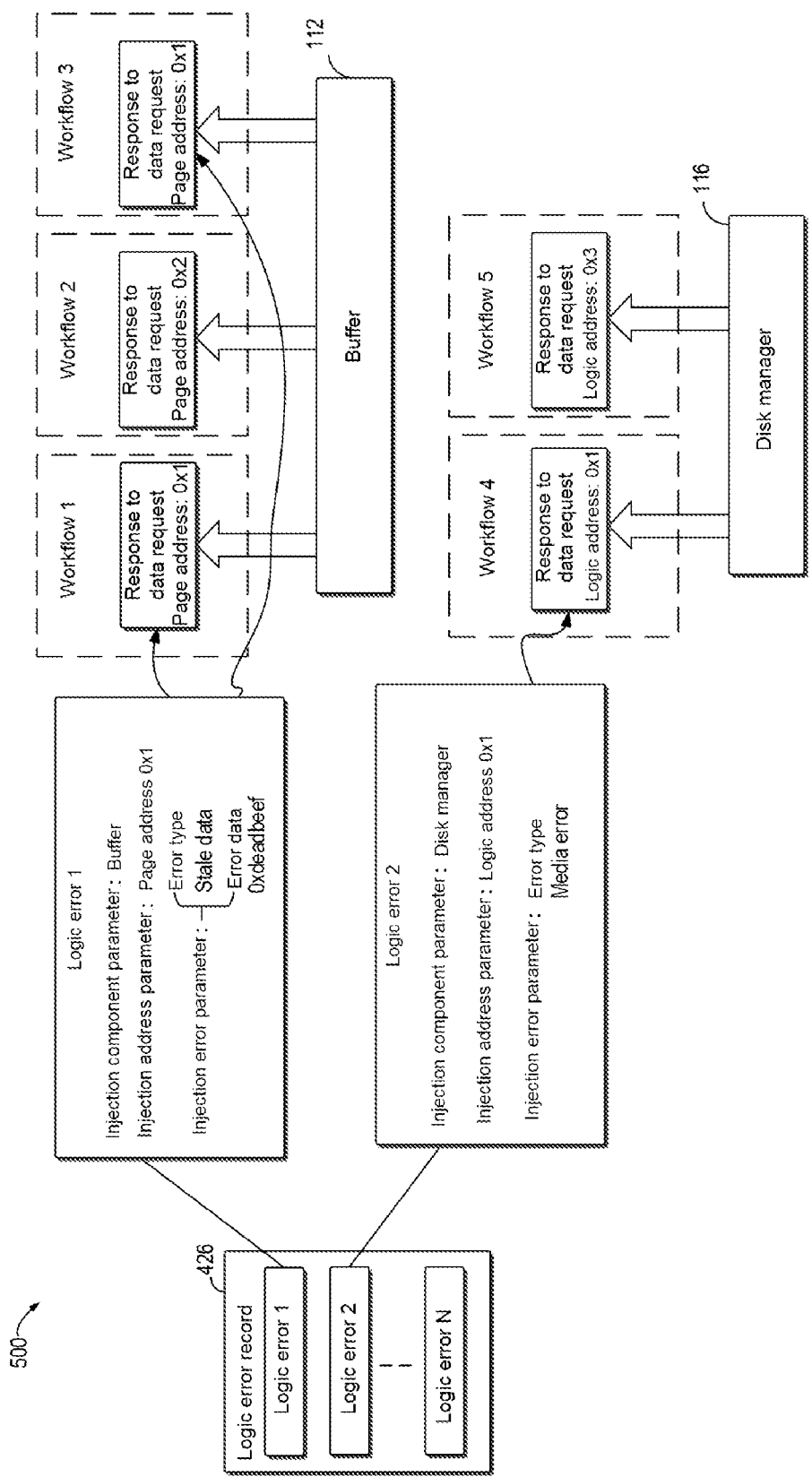
FIG. 5 shows an example block diagram of error injection according to an embodiment of the present disclosure.

An example of error injection according to an embodiment of the present disclosure will be described below with reference to FIG. 5. FIG. 5 shows an example block diagram 500 of error injection according to an embodiment of the present disclosure. It can be understood that the example in FIG. 5 is only by way of example and does not limit the embodiments of the present disclosure.

FIG. 5 by way of example shows that storage device 100 receives two logic errors from logic error record 426: logic error 1 and logic error 2. The injection component parameter in logic error 1 indicates the buffer, the injection address parameter includes page address 0x1 in the buffer, and the injection error parameter includes an error type: stale data and error data: 0xdeadbeef. The injection component parameter in logic error 2 indicates the disk manager, the injection address parameter includes logic address 0x 1 in the disk manager, and the injection error parameter includes an error type: media error.

FIG. 5 shows by way of example workflows, wherein workflows 1-3 are used for interacting with buffer 112, workflow 1 and workflow 3 are used for accessing page address 0x1 in buffer 112, and workflow 2 is used for accessing page address 0x2 in buffer 112. Accordingly, a request address in the response to the data request (such as the response to the page request) in workflow 1 is page address 0x1, a request address in the response to the data request (such as the response to the page request) in workflow 2 is page address 0x2, and a request address in the response to the data request (such as the response to the page request) in workflow 3 is page address 0x1. Workflow 4 and workflow 5 are used for interacting with disk manager 116, workflow 4 is used for accessing logic address 0x1 in disk manager 116, and workflow 5 is used for accessing logic address 0x3 in disk manager 116. Accordingly, a request address in the response to the data request in workflow 4 is logic address 0x1, and a request address in the response to the data request in workflow 5 is logic address 0x3.

Storage device 100 may match the injection address parameter in logic error 1 with the request address parameter in the response to the data request in the workflow. That is, storage device 100 may compare page address 0x1 in logic error 1 with the request addresses in the responses to the data requests in workflow 1 to workflow 5. Storage device 100 may match the injection address parameter in logic error 2 with the request address parameter in the response to the data request in the workflow. That is, storage device 100 may compare logic address 0x1 in logic error 2 with the request address in the response to the data request in workflow 1 to workflow 5.

Taking FIG. 5 as an example, by the matching operation, storage device 100 may determine that the request address parameter in the response to the data request (such as the response to the page request) in workflow 1 is matched with the injection address parameter in logic error 1, and the request address parameter in the response to the data request (such as the response to the page request) in workflow 3 is matched with the injection address parameter in logic error 1. Accordingly, storage device 100 may inject the injection error parameter (including an error type: stale data and error data: 0xdeadbeef) in logic error 1 into the response to the data request (such as the response to the page request) in workflow 1 and the response to the data request (such as the response to the page request) in workflow 3. For example, storage device 100 may inject the error type stale data in logic error 1 into the status in the response to the data request (such as the response to the page request) in workflow 1, and inject the error type stale data in logic error 1 into the status in the response to the data request (such as the response to the page request) in workflow 3. In addition, storage device 100 may inject the error data 0xdeadbeef in logic error 1 into the page data buffer area in the response to the data request (such as the response to the page request) in workflow 1 (for example, replace the previously cached data in the data page buffer area), and inject the error data 0xdeadbeef in logic error 1 into the page data buffer area in the response to the data request (such as the response to the page request) in workflow 3 (for example, replace the previously cached data in the data buffer area), as shown by arrow lines in FIG. 5.

Storage device 100 may further determine that the request address parameter in the response to the data request in workflow 4 is matched with the injection address parameter in logic error 2. Accordingly, storage device 100 may inject the injection error parameter (including an error type: media error) in logic error 2 into the response to the data request in workflow 4. For example, storage device 100 may inject the error type media error in logic error 2 into the status in the response to the data request in workflow 4, thereby implementing error injection.

Figure 6:
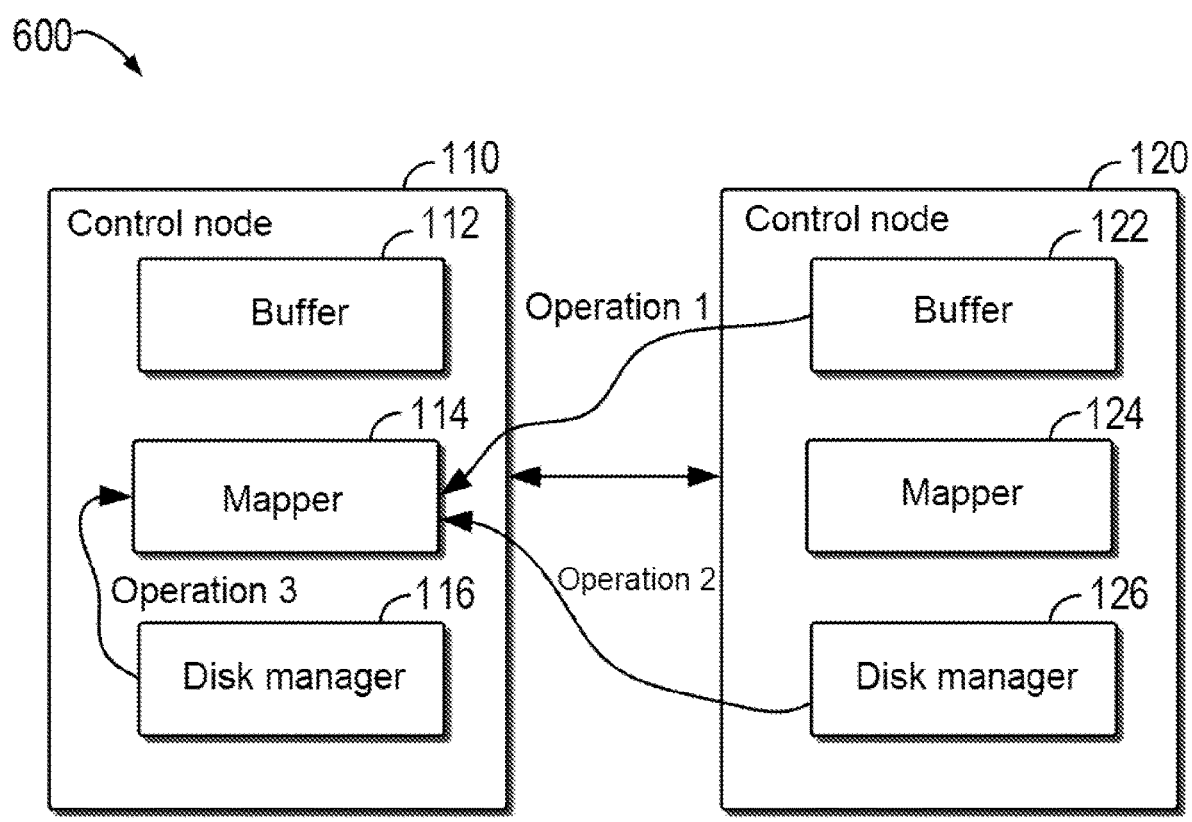
FIG. 6 shows a schematic diagram of an error processing operation according to an embodiment of the present disclosure.

In some embodiments, after the error injection, storage device 100 may trigger a corresponding error processing operation. FIG. 6 shows schematic diagram 600 of an error processing operation according to an embodiment of the present disclosure. The process of the error processing operation according to an embodiment of the present disclosure will be described below with reference to FIG. 6.

After the error injection, storage device 100 triggers an error processing operation to obtain correct data. In some embodiments, the storage device may perform operations 1 to 3 in sequence until the correct data is obtained. In operation 1, control node 110 in storage device 100 (such as mapper 114 in control node 110) obtains the correct data from buffer 122 of backup node 120, for example, restores the correct data. In operation 2, control node 110 (such as mapper 114 in control node 110) obtains the correct data from disk manager 126 of backup node 120. In operation 3, control node 110 (such as mapper 114 in control node 110) obtains the correct data from disk manager 116 of a local node. For example, control node 110 may obtain the correct data from corresponding components according to address parameters (such as request address parameters in the responses to data requests in workflows).

When control node 110 determines that the correct data is already obtained, control node 110 may terminate the error processing procedure and restore the corresponding workflow to continue execution. When the correct data is still not obtained after operations 1 to 3 are performed in sequence, control node 110 may determine that the data is really damaged, and a mark of a bad status is set for the damaged data. Therefore, when other workflows request the damaged data again, the other workflows may determine that there is no need to restore the damaged data according to the set mark of the bad status. Moreover, storage device 100 may take corresponding processing measures, such as correcting the damaged data, so that the storage device may continue to provide high-reliability storage services for users.

It can be understood that the sequence of operations 1 to 3 in FIG. 6 is by way of example. Those skilled in the art can flexibly set the sequence of operations on the buffer and the disk manager in the backup node and the disk manager in the local node according to actual operation conditions of the device, which is not limited in the present disclosure.

Figure 7:
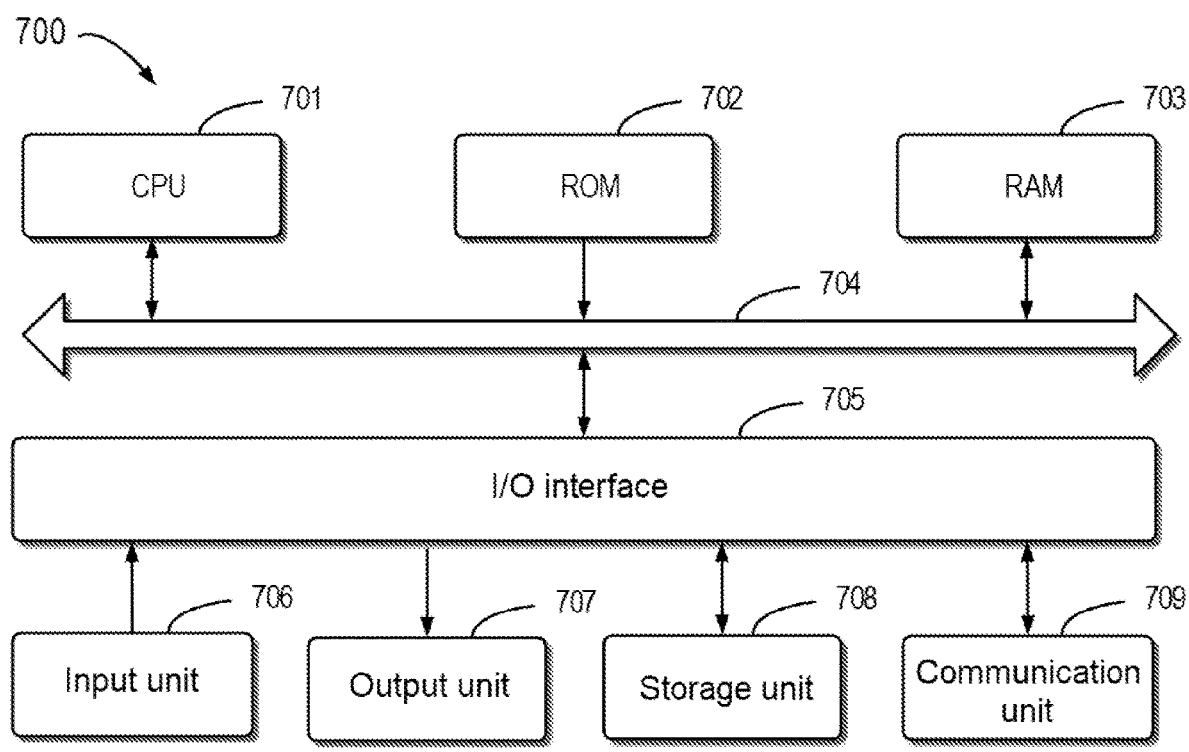
FIG. 7 shows a simplified block diagram of a device suitable for implementing the example embodiments of the present disclosure.

FIG. 7 shows a schematic block diagram of an example device 700 which may be configured to implement the embodiments of the present disclosure. The storage device in FIG. 1 may be implemented by device 700. As shown in the figure, device 700 includes central processing unit (CPU) 701 that may perform various appropriate actions and processing according to computer program instructions stored in read-only memory (ROM) 702 or computer program instructions loaded from storage unit 708 to random access memory (RAM) 703. Various programs and data required for the operation of device 700 may also be stored in RAM 703. CPU 701, ROM 702, and RAM 703 are connected to each other through bus 504. Input/Output (I/O) interface 705 is also connected to bus 704.

A plurality of components in device 700 are connected to I/O interface 705, including: input unit 706, such as a keyboard and a mouse; output unit 707, such as various types of displays and speakers; memory page 708, such as a disk or an optical disk; and communication unit 709, such as a network card, a modem, and a wireless communication transceiver. Communication unit 709 allows device 700 to exchange information/data with other devices via a computer network, such as the Internet, and/or various telecommunication networks.

The various processes and processing described above, such as method 200, may be performed by processing unit 701. For example, in some embodiments, method 200 may be implemented as a computer software program that is tangibly included in a machine-readable medium such as storage unit 708. In some embodiments, part or all of the computer programs may be loaded and/or installed onto device 700 via ROM 702 and/or communication unit 709. When the computer program is loaded into RAM 703 and executed by CPU 701, one or more actions of method 200 described above may be executed.

The present disclosure may be a method, an apparatus, a system, and/or a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device over a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The computer program instructions for executing the operation of the present disclosure may be assembly instructions, instruction set architecture (ISA) instructions, machine instructions, machine-dependent instructions, microcode, firmware instructions, status setting data, or source code or object code written in any combination of one or a plurality of programming languages, the programming languages including object-oriented programming languages such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer may be connected to a user computer through any kind of networks, including a local area network (LAN) or a wide area network (WAN), or may be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions so as to implement various aspects of the present disclosure.

Various aspects of the present disclosure are described here with reference to flow charts and/or block diagrams of the method, the apparatus (system), and the computer program product according to the embodiments of the present disclosure. It should be understood that each block of the flow charts and/or the block diagrams and combinations of blocks in the flow charts and/or the block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means (e.g., specialized circuitry) for implementing functions/actions specified in one or a plurality of blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or a plurality of blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or a plurality of blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or a plurality of executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in a reverse order, which depends on involved functions. It should be further noted that each block in the block diagrams and/or flow charts as well as a combination of blocks in the block diagrams and/or flow charts may be implemented using a dedicated hardware-based system that executes specified functions or actions, or using a combination of special hardware and computer instructions.

The embodiments of the present disclosure have been described above. The above description is illustrative, rather than exhaustive, and is not limited to the disclosed various embodiments. Numerous modifications and alterations are apparent to persons of ordinary skill in the art without departing from the scope and spirit of the illustrated embodiments. The selection of terms used herein is intended to best explain the principles and practical applications of the various embodiments or the technological improvements to technologies on the market, or to enable other persons of ordinary skill in the art to understand the embodiments disclosed herein.

The invention claimed is:

1. A method for error injection, the method comprising:
receiving a logic error comprising an injection address parameter and an injection error parameter;
matching the injection address parameter in the logic error with a request address parameter in a response to a data request in at least one workflow;
in response to that the injection address parameter is matched with the request address parameter, injecting the injection error parameter into the response to the data request; and
in response to the logic error being injected into the response to the data request, updating a number of times of injection corresponding to the logic error in a logic error record.

2. The method according to claim 1, wherein the response to the data request comprises a response returned from a buffer or a response returned from a disk manager.

3. The method according to claim 2, wherein the injection address parameter comprises one or both of a page address in the buffer and a logic address in the disk manager.

4. The method according to claim 2, wherein the logic error further comprises an injection component parameter, and the injection component parameter indicates that the injection address parameter corresponds to the buffer or the disk manager.

5. The method according to claim 4, wherein when the injection component parameter indicates the buffer, the injection address parameter comprises a page address in the buffer; and when the injection component parameter indicates the disk manager, the injection address parameter comprises a logic address in the disk manager.

6. The method according to claim 1, further comprising:
in response to an enabling request for error injection, selecting at least one stored logic error comprising the logic error from the logic error record for error injection,
wherein the at least one stored logic error is stored in the logic error record according to identifiers.

7. The method according to claim 1, wherein the injection error parameter comprises at least one of an error type and error data, and the error type indicates an error status in the at least one workflow.

8. The method according to claim 7, further comprising:
in response to data in the response to the data request being modified into the error data, verifying whether the status corresponding to data in the at least one workflow changes to a bad status.

9. The method according to claim 8, further comprising:
in response to the error type being injected into the response to the data request or the status corresponding to data in the response to the data request being changed to a bad status, starting an error processing operation,
wherein the error processing operation comprises:
performing the following steps in sequence until correct data is obtained:
obtaining the correct data from a buffer of a backup node;
obtaining the correct data from a disk manager of the backup node; and
obtaining the correct data from a disk manager located at a local node; and
in response to the correct data being obtained, continuing to perform the at least one workflow.

10. An electronic device, comprising:
at least one processor; and
a memory coupled to the at least one processor and having instructions stored thereon, wherein the instructions, when executed by the at least one processor, cause the electronic device to perform actions comprising:
receiving a logic error comprising an injection address parameter and an injection error parameter;
matching the injection address parameter in the logic error with a request address parameter in a response to a data request in at least one workflow;
in response to that the injection address parameter is matched with the request address parameter, injecting the injection error parameter into the response to the data request; and
in response to the logic error being injected into the response to the data request, update a number of times of injection corresponding to the logic error in the logic error record.

11. The electronic device according to claim 10, wherein the response to the data request comprises a response returned from a buffer or a response returned from a disk manager.

12. The electronic device according to claim 11, wherein the injection address parameter comprises one or both of a page address in the buffer and a logic address in the disk manager.

13. The electronic device according to claim 11, wherein the logic error further comprises an injection component parameter, and the injection component parameter indicates that the injection address parameter corresponds to the buffer or the disk manager.

14. The electronic device according to claim 13, wherein when the injection component parameter indicates the buffer, the injection address parameter comprises a page address in the buffer; and when the injection component parameter indicates the disk manager, the injection address parameter comprises a logic address in the disk manager.

15. The electronic device according to claim 10, wherein the instructions, when executed by the at least one processor, further cause the electronic device to:
in response to an enabling request for error injection, select at least one stored logic error comprising the logic error from the logic error record for error injection,
wherein the at least one stored logic error is stored in the logic error record according to identifiers.

16. The electronic device according to claim 10, wherein the injection error parameter comprises at least one of an error type and error data, and the error type indicates an error status in the at least one workflow.

17. The electronic device according to claim 16, further configured to:
in response to the error type being injected into the response to the data request or the status corresponding to the data in the response to the data request being changed to a bad status, start an error processing operation,
wherein the error processing operation comprises:
performing the following steps in sequence until correct data is obtained:
obtaining the correct data from a buffer of a backup node;
obtaining the correct data from a disk manager of the backup node; and
obtaining the correct data from a disk manager located at a local node; and
in response to the correct data being obtained, continuing to perform the at least one workflow.

18. The electronic device according to claim 16, further configured to:
in response to data in the response to the data request being modified into the error data, verifying whether the status corresponding to data in the at least one workflow changes to a bad status.

19. A computer program product having a non-transitory computer readable medium which stores a set of instructions for error injection; the set of instructions, when carried out by computerized circuitry, causing the computerized circuitry to perform a method of:
receiving a logic error comprising an injection address parameter and an injection error parameter;
matching the injection address parameter in the logic error with a request address parameter in a response to a data request in at least one workflow;
in response to that the injection address parameter is matched with the request address parameter, injecting the injection error parameter into the response to the data request; and in response to the logic error being injected into the response to the data request, updating a number of times of injection corresponding to the logic error in a logic error record.

20. A method for error injection, the method comprising:

receiving a logic error comprising an injection address parameter and an injection error parameter;

matching the injection address parameter in the logic error with a request address parameter in a response to a data request in at least one workflow;

in response to that the injection address parameter is matched with the request address parameter, injecting the injection error parameter into the response to the data request; and in response to an error type being injected into the response to the data request or the status corresponding to data in the response to the data request being changed to a bad status, starting an error processing operation, the error type indicating an error status in the at least one workflow;

wherein the error processing operation comprises:

performing the following steps in sequence until correct data is obtained:

obtaining the correct data from a buffer of a backup node;

obtaining the correct data from a disk manager of the backup node; and obtaining the correct data from a disk manager located at a local node; and in response to the correct data being obtained, continuing to perform the at least one workflow.

* * * * *